(No Model.)
G. B. DURFEE.
SPARROW GUARD.
No. 588,133. Patented Aug. 17, 1897.
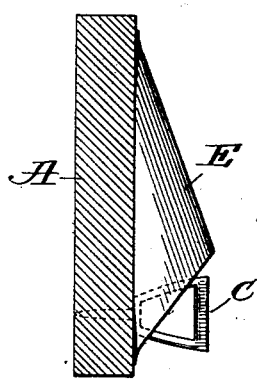
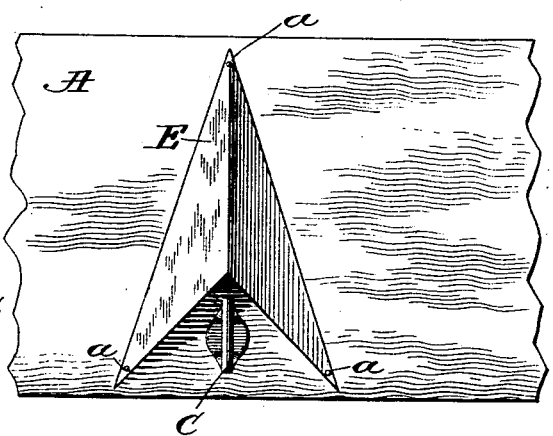
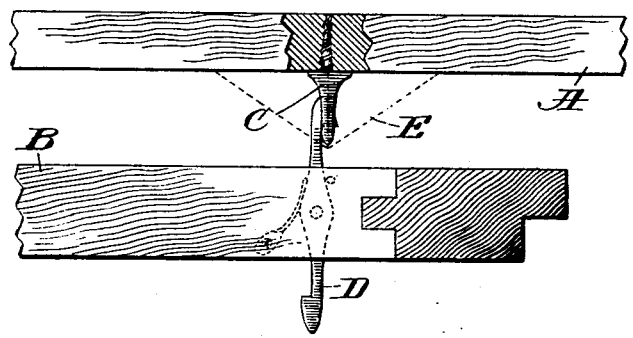
Witnesses:
A. C. Harman
Thomas J. Drummond
Inventor:
George B. Durfee.
by Crosby & Gregory. attys.

UNITED STATES PATENT OFFICE.

GEORGE B. DURFEE, OF FALL RIVER, MASSACHUSETTS.

SPARROW-GUARD.

SPECIFICATION forming part of Letters Patent No. 588,133, dated August 17, 1897.

Application filed May 3, 1897. Serial No. 634,816. (No model.)

*To all whom it may concern:*

Be it known that I, GEORGE B. DURFEE, of Fall River, county of Bristol, State of Massachusetts, have invented an Improvement in Sparrow-Guards, of which the following description, in connection with the accompanying drawings, is a specification, like letters on the drawings representing like parts.

Sparrows multiply very rapidly in towns and cities, and at night they seek resting-places, and one of their favorite spots is on the hook or other fixed part of a blind-fastening standing out from the side of the house and called the "house" part and with which coöperates the other part of the fastening carried by the blind, the said house part presenting a perch between the open blind and the side of the house, and as a result of such roosting the paint on the house soon becomes disfigured.

I have provided a guard which may be put in place to cover and guard the parts of blind-fastenings between the house and the blind when the latter is opened.

My improved device is so shaped as to present a cover or guard with a beveled surface so steep and of such shape that the claws of a bird cannot get hold of it and the bird so retain himself in position.

Figure 1 shows part of a house with one form of stationary or house part of a blind-fastening and one form of my improved guard in place to prevent a swallow or other bird from roosting on the blind-fastening. Fig. 2 is a face view of the parts shown in Fig. 1. Fig. 3 is a horizontal sectional view showing part of the house and a blind with a fastening, my improved device being shown by dotted lines.

Let A represent part of the side of a house; B, a blind; C, the house or stationary part of a blind-fastening, and D the movable or blind-carrying part of the fastening. When the blind is opened and fastened, as is most commonly the case, swallows will rest on the part C, their feet grasping the upper bar of the said stationary part.

To avoid the possibility of the claws of a bird grasping the part C, I have provided a device E, made, preferably, of sheet metal, it being struck up from sheet metal and being V-shaped in cross-section, the apex or edge of the V being centrally located and occupying an acute-angled position, so that a bird cannot rest upon the said edge. This guard is to be attached to the house by suitable tacks or nails $a$ in a position to overlap the fastening, the lower end of the guard being notched or cut away to span the fastening. The guard might, however, be attached to the blind.

The shape of this guard may be variously modified without departing from this invention and instead of being attached to the house it might be secured to the blind.

Having described my invention, what I claim as new, and desire to secure by Letters Patent, is—

1. A sparrow-guard made V-shape in cross-section, the apex of the V presenting a downwardly-inclined acute-angled edge, the lower end of the guard being notched to receive and cover a blind-fastening, substantially as described.

2. The combination with a blind-fastening device, of a sparrow-guard made V-shaped in cross-section, the apex of the V presenting a downwardly-inclined acute-angled edge, the guard being notched or cut away at its lower edge directly below the said acute-angled edge, to operate, substantially as described.

3. The combination with a blind-fastening device, of a sparrow-guard made V-shape in cross-section and having triangular sides, said sides intersecting to form a downwardly-inclined, acute-angled edge, to operate, substantially as described.

In testimony whereof I have signed my name to this specification in the presence of two subscribing witnesses.

GEORGE B. DURFEE.

Witnesses:
ALEX. C. PROUDFIT,
FREDERICK L. EMERY.